(12) United States Patent
Veryaskin et al.

(10) Patent No.: US 8,714,010 B2
(45) Date of Patent: May 6, 2014

(54) GRAVITATIONAL GRADIOMETER

(75) Inventors: Alexey Veryaskin, Noranda (AU);
Howard Golden, Mosman Park (AU);
Wayne McRae, Perth (AU)

(73) Assignee: Gravitec Instruments Limited, St. Peter Post (GG)

( * ) Notice: Subject to any disclaimer, the term of this patent is extended or adjusted under 35 U.S.C. 154(b) by 393 days.

(21) Appl. No.: 13/131,784

(22) PCT Filed: Nov. 25, 2009

(86) PCT No.: PCT/GB2009/002749
§ 371 (c)(1),
(2), (4) Date: Aug. 15, 2011

(87) PCT Pub. No.: WO2010/061183
PCT Pub. Date: Jun. 3, 2010

(65) Prior Publication Data
US 2011/0283789 A1    Nov. 24, 2011

(30) Foreign Application Priority Data

Nov. 28, 2008 (GB) ................................. 0821844.8

(51) Int. Cl.
*G01V 7/10* (2006.01)
(52) U.S. Cl.
USPC ....................................................... 73/382 G
(58) Field of Classification Search
CPC .............. G01V 7/00; G01V 7/16; G01V 7/10
USPC ............ 73/382 R, 382 G; 324/260; 33/355 R
See application file for complete search history.

(56) References Cited

U.S. PATENT DOCUMENTS 2,657,581 A * 11/1953 Fay et al. ..................... 73/382 R
3,564,921 A *  2/1971 Bell ............................... 3/382 R
(Continued)

FOREIGN PATENT DOCUMENTS

CA        2233598 C    4/1996
CA        2233598 C    4/2006
(Continued)

OTHER PUBLICATIONS

International Bureau of WIPO. International Preliminary Report on Patentability, International Application PCT/GB09/02749. May 31, 2011.

(Continued)

*Primary Examiner* — Peter Macchiarolo
*Assistant Examiner* — Samir M Shah
(74) *Attorney, Agent, or Firm* — The Marbury Law Group PLLC

(57) ABSTRACT

Apparatus for the measurement of quasi-static gravity gradients comprising: a flexible ribbon held under tension at both ends; sensing means arranged to detect the transverse displacement of the ribbon from an undisturbed position due to the gravitational field acting on said ribbon and to generate a signal representing the displacement; and output means coupled to said sensing means and responsive to said displacement signal to generate an output signal which is a function of the gravitational gradient tensor of the gravitational field; wherein the ribbon has a non-uniform rigidity profile and/or mass profile along its length such that, in use, the displacement response of the ribbon due to the gravitational gradient of the gravitational field is enhanced and/or the displacement response of the ribbon due to the absolute gravitational acceleration of the gravitational field is suppressed.

31 Claims, 7 Drawing Sheets

(56) References Cited

U.S. PATENT DOCUMENTS

| | | | |
|---|---|---|---|
| 3,592,062 A * | 7/1971 | Mathey | 73/382 R |
| 3,611,809 A * | 10/1971 | Cantat et al. | 3/382 G |
| 3,722,284 A * | 3/1973 | Weber et al. | 73/382 R |
| 3,769,840 A | 11/1973 | Hansen | |
| 4,581,932 A | 4/1986 | Lautzenhiser et al. | |
| 5,130,654 A | 7/1992 | Mermelstein | |
| 5,962,781 A * | 10/1999 | Veryaskin | 73/382 G |
| 6,871,542 B2 * | 3/2005 | Veryaskin | 73/382 G |
| 7,176,680 B1 * | 2/2007 | Veryaskin | 324/260 |
| 2001/0035750 A1 * | 11/2001 | Murphy | 324/260 |
| 2004/0231417 A1 * | 11/2004 | Verysaskin | 73/382 G |

FOREIGN PATENT DOCUMENTS

| | | | | |
|---|---|---|---|---|
| GB | 671392 | | 5/1952 | |
| GB | 2464151 A | * | 4/2010 | G01R 33/022 |
| WO | 9610759 | | 4/1996 | |
| WO | WO 9610759 A1 | * | 4/1996 | G01V 7/00 |
| WO | 03/027715 A1 | | 4/2003 | |
| WO | 03027715 A1 | | 4/2003 | |
| WO | WO 0327715 A1 | * | 4/2003 | G01V 7/00 |

OTHER PUBLICATIONS

A. Veryaskin, et al. "On the Combined Gravity Gradient Components Modeling for Applied Geophysics"; Journal of Geophysics and Engineering; vol. 5; © 2008.

International Search Report, International Application PCT/GB09/02749. WIPO (ISA/EP), Mar. 8, 2011.

Intellectual Property Office of the United Kingdom—Search Report, issued in Application No. GB0821844.8, dated Apr. 30, 2009.

International Search Report and Written Opinion, issued in Application No. PCT/GB2009/002749, dated Mar. 8, 2011.

* cited by examiner

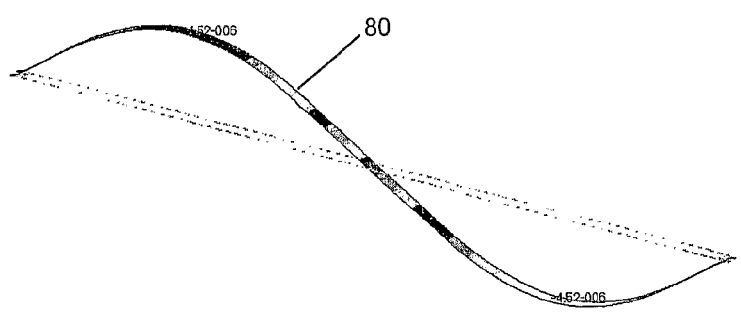
Figure 8a
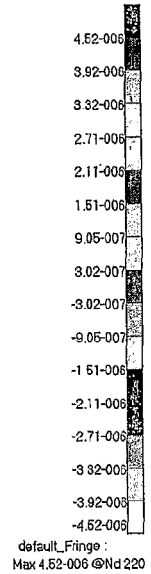
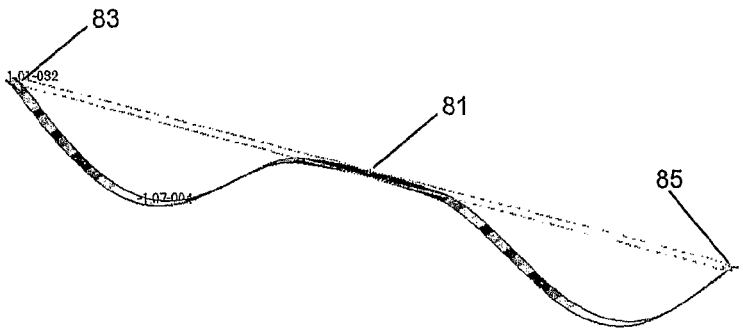
Figure 8b
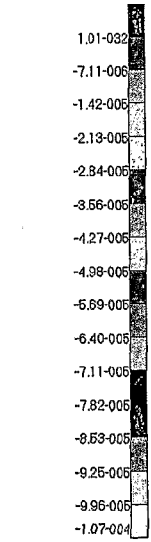

GRAVITATIONAL GRADIOMETER

FIELD OF THE INVENTION

The invention relates to an apparatus for directly measuring components of the gravitational gradient tensor, particularly the off-diagonal components of the tensor, and to a method of measuring said tensor components.

BACKGROUND OF THE INVENTION

Gravitational gradiometry is the measurement of the gravitational gradient field of differential accelerations between two infinitesimally close spatial points. The gravitational gradient field is described by a second rank tensor, $T_{ij}$:

$$T_{ij} = -\partial_{i,j}^2 V(x,y,z) \quad (1)$$

wherein i, j=(x, y, z) and the scalar V is the gravitational potential of a local reference frame of orthogonal Cartesian coordinates (x, y, z). Taking the z axis as pointing vertically into the ground, the components of the tensor at some point in the local reference frame (x, y, z), calculated by determining the spatial rate of change along directions x, y and z of the spatial rate of change of the gravitational potential in directions x, y and z, represent the rate of change of acceleration due to gravity along that direction. For example, the component $T_{yz}$ represents the rate of change along the y direction of acceleration due to gravity along the direction z towards the ground, and is typically measured in units of Eötvös Units (1 Eötvös=1 EU=$10^{-9}$ $s^{-2}$). The tensor consists of nine components, only five of which are totally independent due to their geometrical symmetry (i.e. $T_{ij}=T_{ji}$, where i≠j) and due to the validity of the Laplace equation (i.e. $T_{xx}+T_{yy}+T_{zz}=0$) for gravitational potential fields outside of the extent of gravitational field sources.

Providing apparatus that enables accurate and absolute measurements of the various components of the gravity gradient tensor $T_{ij}$ is very important in the fields of oil, gas and mining of various other natural resources. Gravitational gradiometry particularly enables the mapping of variations in the density of subsurface rocks and deposits to assist in the targeting of prospecting, and in increasing the effectiveness of drilling for oil and gas and mining. Gravitational gradiometry finds further application in defence and space industries for navigation and reconnaissance (e.g. void detection), geological prospecting, sub-sea/underwater navigation and exploration, terrestrial and marine archaeology, medicine and space exploration (for example, obtaining density maps of asteroids and other solar system orbital bodies).

For many gravity gradiometry applications, it is the $T_{zz}$ component (i.e. the second order derivative of gravitational potential in the vertical direction) that many gradiometers aim to measure, whether by direct measurement, or by measuring at least some of the other tensor components and recalculating $T_{zz}$ from their dependent relationship, or both. However, in their paper 'On the combined gravity gradient modeling for applied geophysics', Journal of Geophysics and Engineering, 2008, Vol 5, pp 348-356, Veryaskin and McRae show that by measuring and using the two off-diagonal gravity gradient tensor components $T_{xz}$ and $T_{yz}$, it is possible to obtain more information about anomalous subsurface density contrasts than by measuring and using the vertical gravity gradient component $T_{zz}$. To retrieve this subsurface density information, a gradiometer arrangement is required that is capable of simultaneously producing real-time data sets of direct measurements of both the $T_{xz}$ and $T_{yz}$ tensor components.

A method of absolute measurement of gravity gradient tensor components was invented first by Baron Loránd von Eötvös as early as 1890, utilising a torsion balance with proof masses hung at different heights from a horizontal beam suspended by a fine filament. The gravity gradients give rise to differential forces being applied to the masses which result in a torque being exerted on the beam, and thus to angular deflection of the masses which can be detected with an appropriate sensor. A sensitivity of about 1 EU can be reached but measurement requires several hours at a single position due to the necessity to recalculate the gravity gradient components from at least five independent measurements of an angular deflection each with a different azimuth angle.

Practical devices, which have been built in accordance with this basic method of Eötvös, are large in size, bulky and have low environmental noise immunity, thus requiring specially prepared conditions for measurements. This excludes any possibility of using them on a moving carrier or for many practical applications where there are weight or space constraints, such as in the confined environment of a borehole, and in airborne drones, space launcher payloads, satellites, and extraterrestrial rovers.

Another method for absolute measurement of gravity gradient tensor components which enhances the above method was invented by Forward in the 1960s (see U.S. Pat. No. 3,722,284 (Weber et al) and U.S. Pat. No. 3,769,840 (Hansen)). The method comprises mounting both a dumbbell oscillator and a displacement sensor on a platform which is in uniform horizontal rotation with some frequency $\Omega$ about the axis of the torsional filament. The dumbbell then moves in forced oscillation with double the rotational frequency, whilst many of the error sources and noise sources are modulated at the rotation frequency or not modulated (particularly 1/f noise). The forced oscillation amplitude is at a maximum when the rotation frequency satisfies the resonance condition $2\Omega/=\omega_0$, where $\omega_0$ is the angular resonant frequency, and the oscillator quality factor Q tends to infinity. Unlike the non-rotating method, this method enables one to determine rapidly the quantities $T_{yy}-T_{xx}$ and $T_{xy}$ by separating the quadrature components of the response using synchronous detection with a reference signal of frequency 2 $\Omega$.

The same principles can be directly used, as proposed by Bell (see U.S. Pat. No. 3,564,921), if one replaces the dumbbell oscillator with two or more single accelerometers properly oriented on such a moving platform. There are no new features of principle in this solution to compare with the previous one except that the outputs of the pairs of accelerometers require additional balancing.

Devices have been built according to this method, but they have met more problems than advantages, principally because of the need to maintain precisely uniform rotation and the small displacement measurement with respect to the rotating frame of reference. The devices have reached a maximum working accuracy of about a few tens of Eötvös for a one second measuring interval, and they are extremely sensitive to environmental vibrational noise due to their relatively low resonant frequencies. The technological problems arising in this case are so difficult to overcome that the existing developed designs of rotating gravity gradiometers show a measurement accuracy which is much lower than the limiting theoretical estimates.

In WO-A-96/10759 a method and apparatus for the measurement of two off-diagonal components of the gravity gradient tensor is described. According to this document, the transverse deflection of a stationary flexible string with fixed ends in its second fundamental mode of oscillation (the 'S' mode, as shown in FIG. 10b) is coupled to an off diagonal gravity gradient, whilst its deflection in its first fundamental mode of oscillation (the 'C' mode, see FIG. 10a) is coupled to an effective (i.e averaged with a weight function along the string's length) transverse gravitational acceleration. In other words, a string with fixed ends is bent into its 'S' mode by a gravity gradient only, provided that it does not experience any angular movements. Therefore, by measuring absolutely the mechanical displacement of such a string which corresponds to the 'S' mode it is possible to measure absolutely an off-diagonal component (i.e. $T_{xz}$ or $T_{yz}$, for a string aligned along the z axis) of the gravity gradient tensor. While this document teaches the use of a one-dimensional 'string', any generic element having a width and depth much smaller than its length, for example, a flat ribbon, is suitable.

In this design for a gradiometer having a current-carrying string, or ribbon, of length l aligned along the z axis and having a uniform mass distribution per unit length along its extent, the displacement, y(z,t), of the string from its undisturbed position (i.e. the straight line joining its fixed points at both ends), for example in the y-direction of the local coordinate frame as a function of the z-position of a unit element, and of time, t, can be described by the following force balancing equation for a vibrating string. (N.B. A similar equation and following analysis is applicable to the orthogonal direction transverse to the string and to any number of other directions).

$$\eta \frac{\partial^2}{\partial t^2} y(z, t) + h \frac{\partial}{\partial t} y(z, t) - YA \frac{\Delta l}{l} \frac{\partial^2}{\partial z^2} y(z, t) = \quad (3)$$
$$-\eta g_y(0, t) - \eta T_{yz}(0, t)z + I(t)B_x(0, t) - I(t)B_{xz}(0, t)z + \text{thermal noise}$$

The components on the right hand side of the equation represent the forces acting on the string (including gravitational and magnetic forces) in the y direction, and the components on the left hand side of the equation represent the restoring string forces in the y direction.

The equation has the boundary conditions corresponding to the fixed ends of the string, i.e. y(0,t)=y(l,t)=0. In this equation η denotes the string's mass per unit length, h is the friction coefficient per unit length, the parameters Y, A and Δl/l are the string's Young modulus, the area of its cross section and the string's strain respectively. The quantity $g_y(0, t)$ is the absolute value of the y-component of the gravitational acceleration and $T_{yz}(0,t)$ the corresponding gravity gradient tensor component along the string, both taken at the centre of the local coordinate frame chosen (i.e. z=0). The quantity I(t) is the current flowing through the string. It is well known that a conductor carrying a current I(t) in a non-uniform magnetic vector field of flux density B(x, y, z) is subject to force F=I (t) {n×B(x, y, z)}, where n is the unit vector in the direction of current flow, in this case the z direction. The quantities $B_x(0, t)$ and $B_{xz}(0, t)$ therefore represent the absolute values of the x-component of the magnetic field and the corresponding magnetic gradient tensor component along the string, respectively, both taken at the centre of the local coordinate frame chosen.

Since the string is subject to Brownian fluctuations, the corresponding thermal noise driving source is included on the right side of equation (3).

Of the gravitational force components of the equation (3), $-\eta g_y(0, t)$ represents the force in they direction on the unit element of the string due to the acceleration due to gravity, and $-\eta T_{yz}(0,t)z$ represents the force in they direction on the unit element of the string due to the change along the z direction in the acceleration due to gravity.

Applying Fourier analysis to the complex shape of the string caused by its interaction with the gravitational and magnetic field, the function y(z,t), can be described, in the range z=0 to z=l, by an infinite sum of sinusoidal functions of period 2 l, with appropriate coefficients $c_y(n,t)$. Thus a solution of force balance vibration equation (3), which satisfies the boundary conditions shown above, can be represented by the following sum (4) wherein each term in n corresponds to one of the string's natural vibrational modes.

$$y(z, t) = \sum_{n=1}^{infinity} c_y(n, t) \sin\left(\frac{\pi n}{l} z\right) \quad (4)$$

By substituting equation (4) into equation (3) and by multiplying its left-hand and right-hand sides by sin(πn'z/l), and then by integrating both sides over z from 0 to l, one can obtain the following differential equation (4) for $c_y(n,t)$.

$$\frac{d^2}{dt^2} c_y(n, t) + \frac{2}{\tau} \frac{d}{dt} c_y(n, t) + \omega_n^2 c_y(n, t) = \quad (5)$$
$$\frac{2}{\pi n}[(-1)^n - 1]\left[g_y(0, t) + \frac{1}{\eta} I(t) B_x(0, t)\right] +$$
$$(-1)^n \frac{2l}{\pi n}\left[T_{yz}(0, t) + \frac{1}{\eta} I(t) B_{xz}(0, t)\right] + \text{thermal noise}$$

where the quantities $$\omega_n = \frac{\pi n}{l} \sqrt{\frac{Y}{\rho} \frac{\Delta l}{l}} \quad (6)$$

represent the string's natural frequencies; and r and p are the relaxation time and the volume mass density of the string respectively.

When n takes an even value (i.e. for those terms $c_y(n,t)$ of the infinite sum in equation (4) corresponding to anti-symmetric vibrational modes of the string having a node at z=l/2, the midpoint of the string), the force component of equation (5) involving $g_y(0,t)$ and $B_x(0, t)$ is equal to zero and the force component being a function of the gravitational gradient tensor component $T_{yz}$ and magnetic field gradient tensor component $B_{xz}(0, t)$ remains. Thus, for anti-symmetric modes of the string (i.e. n=even), $c_y$ is dependent only on $T_{yz}$ and $B_{xz}(0, t)$ (and thermal noise).

In practice this means that the amplitude, $c_y$, of the anti-symmetric sinusoidal components of the deflection of the string in the y-direction, y(z,t), is dependent only on the magnitude of the gravity gradient tensor component $T_y$ and the magnetic field gradient tensor component $B_{xz}(0, t)$.

The string has an effective mechanical bandwidth of oscillation limiting its displacement response to oscillations below a few kHz (even for extremely stiff strings). The force on the string due to the magnetic field gradient is dependent on the current carried in the string. Therefore, by not pumping the string with any current at all or by pumping the string with an alternating current well outside the mechanical bandwidth of the string, the string will effectively not be sensitive to magnetic field gradients because oscillations at such frequencies are damped. In this way a string sensitive only to the gravity gradient tensor component $T_y$ is provided.

The mid point of the string, $z=l/2$, is the position of a node in all anti-symmetric vibrational modes of the string. If sensors are positioned symmetrically in the longitudinal direction with respect to this point, it will be possible to identify displacements of the string corresponding to the string's natural anti-symmetric vibrational modes while discounting displacements corresponding to the string's symmetric vibrational modes.

It is particularly advantageous if displacement sensors are positioned at $z=l/4$ and $z=3\,l/4$, positions corresponding to the antinodes of the first anti-symmetric vibrational mode of the string, $n=2$ (the 'S' mode). At these points the displacement of the string corresponding to the 'S' mode is at a maximum and thus the gradiometer sensing signal will also be at a maximum, giving optimum sensitivity.

In WO 96/10759, two rectangular type pick-up coils in the form of a Superconducting Quantum Interference Device (SQUID) are arranged to detect the transverse displacement in a superconducting Niobium string held under tension at its ends inside a superconducting casing; the whole apparatus being cooled to 4.2K or less in a cryogenic liquid helium vessel. Solenoids arranged symmetrically at either end of the string are driven by an alternating signal having frequency $\Omega$ to induce an AC supercurrent in the string also having frequency $\Omega$. The superconducting casing excludes the external magnetic field from the casing such that no magnetic field forces act on the string and the displacement of the string from its straight line configuration is in response to the gravitational field only. The two coils of the SQUID device are positioned proximate to the string and are located at symmetrical longitudinal positions one on either side of the mid-point of the string and are arranged in a circuit as two arms of a superconducting magnetic flux transformer. The AC supercurrent carried by the string induces a current in each coil of the SQUID device proportional to the displacement of the string at that point from its undisturbed position. If the positions and responses of the two coils are arranged such that the two arms of the magnetic flux transformer are perfectly balanced either side of the mid-point of the string, the response is in 'anti-phase' such that the symmetrical modes of the string (i.e. $n$=odd, including the dominant 'C' mode) do not produce any signal current in the flux transformer. For the anti-symmetric modes, the displacement response of the string is dominated by the $n=2$'S' mode and all higher modes can be ignored (or factored in to error sources); then it follows that the output voltage of the SQUID is an AC signal having frequency $\Omega$ and an amplitude that is proportional to the displacement of the string in the first anti-symmetric 'S' mode only, and hence, to the off-diagonal gravitational gradient component (in the example given above, $T_{yz}(0,t)$). The amplitude of this SQUID output signal is obtained by synchronous detection of the signal using the alternating signal driving the solenoids as a reference. A force feedback circuit is also provided which takes as an input the voltage output of the SQUID and induces in the string a feedback current formed from this voltage output to increase the sensitivity of the device to the gravitational gradient component. For, a gradiometer of this design having typical practical parameters, the theoretical minimum gravity gradient detectable is calculated as being 0.02 EU. The string-based gravitational gradiometer device is less sensitive to vibrational noise than the earlier rotating gradiometer designs and lends itself to deployment on a mobile platform where measurements can be taken to retrieve high resolution data of local differences in gravity gradient. However, deployment is problematic in that the linear and angular accelerations of the mobile platform affect the deformation of the string and the output of the device.

In WO 03/27715 the string based gradiometer design is developed further by providing a gravity gradiometer in which the string is in the form of a uniform metal strip or ribbon and is constrained to its rest position at its mid-point, with, for example, a rigid knife-edge mounted to the casing and touching the ribbon but not exerting any force thereon. This knife-edge restricts any movement of the ribbon at that point and adds another boundary condition with the effect that deformation of the string into all symmetric modes (i.e. $n$=odd) is limited while deformation into all anti-symmetric modes (i.e. $n$=even), including the dominant 'S' mode, is permitted. Notably, deformation of the ribbon into the otherwise dominant first order symmetric 'C' mode is significantly limited. This use of a ribbon arrangement in place of a string is such that the ribbon is more constrained in its movement making the output of the device less dependent on linear accelerations exerted on the device and more manageable. This makes the device more suitable for operation on mobile platforms. The device operates in a liquid nitrogen cryogenic bath at 77K which reduces the effects of thermal noise and increases mechanical stability. In place of a SQUID device, two pick-up coils are provided positioned symmetrically about a mid-point of the ribbon and arranged as two arms of a resonant bridge circuit tuned to the frequency of an alternating carrier signal supplied to the ribbon as an alternating current. The frequency of the AC carrier current pumped to the ribbon is above the mechanical bandwidth of the tensioned ribbon such that the ribbon's displacement response due to interaction forces with the ambient magnetic field is damped and the detected signal is dependent on the gravitational field only. The two coils are located at positions directly adjacent the antinodes of the first anti-symmetric mode of the ribbon (i.e. at $z=L/4$ and $z=3\,L/4$) which correspond to the maximum displacement and increases the sensitivity of the response. A voltage signal is induced in the bridge circuit having the same frequency as the carrier signal, and having an amplitude that is a measure of the average deflection of the ribbon over a region situated around the $L/4$ and $3\,L/4$ positions. By synchronously detecting the voltage amplitude of the induced signal with reference to the carrier signal, the amplitude of the local off diagonal gravity gradient component can be retrieved. The response of the ribbon is modulated with a square wave by indirectly changing its stiffness between a high value and a low value. This is achieved by using a square wave signal to switch a negative feedback circuit arranged to periodically produce in the ribbon a current signal proportional to the output of the bridge circuit but in anti-phase or quadrature therewith such that the ribbon becomes stiffened and is forced to its rest position. In the high stiffness or tensioned state, the response of the detector to the gravity gradients is low, and in low stiffness or relaxed state the response of the detector to the gravity gradients is high. This modulated output is retrieved using a lock-in amplifier. Three sets of four single axis gradiometer modules are provided in an 'umbrella' arrangement to remove the effect of angular accelerations on the output of the combined device, which is capable of providing absolute and direct measurement of all gravitational gradient tensor components.

In these string based gravitational gradiometers, the ability of the string to simultaneously deform into the 'S' mode and the other 'parasitic' symmetric modes introduces a significant noise source into the gradiometer device. The sensitivity of the gradiometer can be increased by the two detector coils being well balanced either side of the mid-point of the string to cancel out these unwanted parasitic modes. However, this balancing does not eliminate the effect that the deformation of the string in its symmetric modes has on the detectors and these unwanted parasitic modes make a significant contribution to the noise level above which the gradiometer signal, contributed by the deformation of the string in its anti-symmetrical (i.e. n=even) modes of oscillation, must be detected.

As described above, WO 03/027715 discloses one solution to this problem by providing a knife-edge at the mid-point of the string to add another boundary condition by constraining the string at its rest position there. This acts to restrict the string from deforming in its symmetric modes, most notably its 'C' mode. However, the string remains susceptible to deformation in the 'W' mode of oscillation (illustrated in FIG. 10c), which is the linear sum of all residual symmetric mode deflections. While deflection in this 'W' mode is of a smaller amplitude than that of the total deflection of an unconstrained string without a knife edge due to all symmetric modes, it remains a significant noise source that can limit the operational sensitivity of the apparatus to gravitational gradient signals.

SUMMARY OF THE INVENTION

It is an object of the present invention to provide an apparatus for the measurement of gravitational gradients having high sensitivity to gravitational gradient and low sensitivity to absolute gravitational acceleration.

Viewed from one aspect the present invention provides apparatus for the measurement of quasi-static gravity gradients comprising: a flexible ribbon held under tension at both ends; sensing means arranged to detect the transverse displacement of the ribbon from an undisturbed position due to the gravitational field acting on said ribbon and to generate a signal representing the displacement; and output means coupled to said sensing means and responsive to said displacement signal to generate an output signal which is a function of the gravitational gradient tensor of the gravitational field; wherein the ribbon has a non-uniform rigidity profile and/or mass profile along its length such that, in use, the displacement response of the ribbon due to the gravitational gradient of the gravitational field is enhanced and/or the displacement response of the ribbon due to the absolute gravitational acceleration of the gravitational field is suppressed.

The gradiometer apparatuses of the prior art have string or ribbon sensing elements with a uniform rigidity profile and mass profile. This leads to a uniform, or standard displacement response to applied forces, causing the sensing element to oscillate in its different modes indiscriminately.

In accordance with the invention, a gradiometer having high sensitivity to gravity gradient signals is provided by a ribbon that has a varying rigidity and/or mass profile along the length of the ribbon.

By rigidity profile, it is meant the variation along the ribbon of the force required to deform the ribbon in its direction of oscillation by an equal amount.

By mass profile, it is meant the variation along the ribbon of the mass per unit length of the ribbon.

By arranging the ribbon to have a varying rigidity and/or mass profile along its length such that the deformation of the ribbon in its symmetrical modes of oscillation is suppressed, the effect of absolute gravitational acceleration on the ribbon displacement is low and the contribution of the 'gravimeter' component in the signal detected by the sensing means is also low. Therefore the gradiometer signal is more prominent against a quieter background signal. By suppressing of the ribbon displacement due to the effect of absolute gravitational acceleration, it is only meant that the ribbon's displacement is reduced relative to an equivalent ribbon having a uniform mass and rigidity profile, not that the displacement due to absolute gravitational acceleration is necessarily eliminated entirely.

Similarly, by arranging the ribbon to have a varying rigidity and/or mass profile such that the deformation of the ribbon in its anti-symmetric modes of oscillation is enhanced, the effect of gravity gradient on the ribbon displacement is high and the contribution of gradiometer component in the signal detected by the sensing means is also high.

Thus, in accordance with the invention, the ribbon can be engineered such that its displacement response due to applied gravitational forces increases the sensitivity of the apparatus to the gravitational gradient when compared with an equivalent apparatus having a string or ribbon sensing element having a uniform rigidity profile and mass profile. In this way, the ribbon of the present invention is designed 'intelligently' to provide a response that discriminates between applied forces, in such a way as to increase the sensitivity of the apparatus to the gravity gradient.

In the invention the ribbon may have a non-uniform rigidity profile and a uniform mass profile. Alternatively the ribbon may have a non-uniform mass profile and a uniform rigidity profile. Alternatively, and preferably, the ribbon has a non-uniform rigidity profile and a non-uniform mass profile. The arrangement of the non-uniform mass and rigidity profiles of the ribbon may be any that is suitable to enhance the displacement response of the ribbon due to the gravitational gradient of the gravitational field and/or suppress the displacement response of the ribbon due to the absolute gravitational acceleration of the gravitational field. The means and method by which such a suitable ribbon profile can be provided and manufactured will be evident from the following description and exemplary embodiments.

The rigidity and/or mass profile of the ribbon are preferably arranged such that the ribbon is relatively less able to deform in its symmetric modes and is not relatively less able to deform in its anti-symmetric modes than an equivalent ribbon having a uniform rigidity profile and/or mass profile along its length. More preferably, the rigidity and/or mass profile of the ribbon are arranged such that the ribbon is relatively less able to deform in the 'C' mode and 'W' mode and is, not relatively less able to deform in the 'S' mode than an equivalent ribbon having a uniform rigidity profile and/or mass profile along its length. In accordance with these preferred forms of the invention, the gradiometer signal is more prominent against a quieter noise level resulting from the parasitic modes such that the two signals can be easily discriminated.

To achieve this, the rigidity of the ribbon around the midpoint between its longitudinal ends is preferably relatively increased compared with other sections of the ribbon. By relatively increasing the rigidity of the ribbon at its mid-point, the ribbon is less susceptible to deformation into its 'C' and 'W' modes of oscillation, in which the ribbon is required to bend significantly at its mid-point. This increased rigidity does not act in any way to suppress the 'S' mode of oscillation, in which the ribbon is not required to bend significantly at its mid-point.

In this preferred arrangement, the relatively increased rigidity of the ribbon about its mid-point is preferably provided by a relatively thickened section of the ribbon about its mid-point. Thickening the ribbon provides a mechanism for suppression of the 'C' and 'W' modes that is simple to manufacture.

The rigidity and/or mass profile of the ribbon are preferably arranged such that the ribbon is relatively more able to deform in its anti-symmetric modes than an equivalent ribbon having a uniform rigidity profile and/or mass profile along its length. More preferably, the rigidity and/or mass profile of the ribbon are arranged such that the ribbon is relatively more able to deform in the 'S' mode than an equivalent ribbon having a uniform rigidity profile and/or mass profile along its length. In accordance with these preferred forms of the invention, the gradiometer signal is of a higher magnitude and can be more easily detected against the noise level resulting in part from the parasitic modes.

To achieve this, the rigidity of the ribbon is preferably relatively reduced about at the L/4 and 3 L/4 positions along the length of the ribbon compared with other sections of the ribbon. This reduction in rigidity is preferably provided by relatively thinning the ribbon in these areas. As the ribbon is required to bend at the L/4 and 3 L/4 positions in its 'S' modes of oscillation, the amplitude of the ribbon's displacement in this mode is increased in this preferred arrangement. To deform in the 'C' mode of oscillation, the ribbon does not particularly need to bend significantly at the L/4 and 3 L/4 positions and so this mode is relatively unaffected. Since the ribbon is also required to bend at the L/4 and 3 L/4 positions in its 'W' mode of oscillation, the amplitude of the ribbon's displacement in this mode is also increased unless another rigidity or mass profile feature of the ribbon is provided to suppress it. Therefore, alternatively or in addition, the rigidity of the ribbon is preferably greater at the mid-point between its longitudinal ends than at the L/4 and 3 L/4 positions along the length of the ribbon. In this preferred arrangement, the 'W' mode of oscillation of the ribbon is effectively suppressed by the relatively rigid mid-point of the ribbon, and so the ribbon is as a result more susceptible to displacement in the 'S' mode of oscillation in preference to the 'W' mode.

Alternatively, or in addition, the mass per unit length of the ribbon is preferably increased around the L/4 and 3 L/4 positions along the length of the ribbon compared with other sections of the ribbon. By providing increased mass around the L/4 and 3 L/4 positions, the force on the ribbon at these locations in increased and thus the total deflection of the ribbon is increased for the same gradient accelerations of the gravitational field. This increases the displacement response of the ribbon in its 'S' mode and also its parasitic 'W' mode. However, the displacement response of the ribbon in its 'W' mode is preferably suppressed, preferably in the way described above. Thus the sensitivity of the apparatus to the gravitational gradient is increased.

The features of these preferred arrangements that provide a ribbon that is relatively more able to deform in the 'S' mode can be provided in combination with the preferred arrangements described above that provide a ribbon that is relatively less able to deform in the 'C' mode and 'W' mode.

The rigidity of the ribbon is preferably relatively reduced at the boundary condition locations at the end-points of the ribbon. This is preferably achieved by making the ribbon relatively thin in the region of its end-points. By providing reduced rigidity at the end-points of the ribbon the ribbon is more easily able to deflect at these points about the end boundary conditions. Alternatively, or in addition, if clamping means is provided at both ends of the ribbon to hold the ribbon under tension, the clamping means is preferably arranged such that the ribbon is easily able to deflect about the clamping means, and such that the ribbon is not permitted to translate laterally away from the clamping means. In accordance with these preferred arrangements in which the ribbon is more easily able to deflect about its end boundary conditions, the effective length of the ribbon is greater and the deflections of the ribbon are maximised. When the 'C' and 'W' modes are suppressed by other rigidity or mass profile features, enabling the ribbon to more easily deflect about its end points serves only to maximise the amplitude of the 'S' mode oscillation and the gradiometer sensitivity.

The thickness of the plane of the ribbon preferably varies along its length so as to give the non-uniform rigidity and/or mass profile. Preferably, the varying profile of the thickness of the plane of the ribbon is provided by a section of the ribbon having material removed from the ribbon to reduce its planar thickness by machining or by chemical etching and/or by a section of the ribbon having material added to the ribbon to increase its planar thickness by vapour deposition. Varying the thickness of the ribbon is a simple way to vary the rigidity and mass profile of the ribbon to alter its susceptibility to oscillations in its different modes.

The ribbon's material properties preferably vary along the length of the ribbon so as to give the non-uniform rigidity and/or mass profile. Such material properties may include at least one of density, elastic modulus, specific modulus, alloy composition, material composition, lamination characteristics, type of material in composite, etc. By varying the material properties of the ribbon, the susceptibility of the ribbon to oscillations in its different modes can be more completely controlled. Preferably, the varying profile of the ribbon's material properties is provided by an annealed section of the ribbon and/or a tempered section of the ribbon. Tempering a section of the ribbon generally increases the rigidity of that section, whereas annealing a section of the ribbon generally reduces the rigidity of that section. Heat treating the ribbon to temper and/or anneal a section of the ribbon is a simple processing method to provide a non-uniform rigidity profile whereby the mass of the ribbon is not increased and the ribbon has a simple structure. Further still, no thickening or thinning of the ribbon is required to increase or decrease its rigidity.

The cross-sectional profile of the ribbon preferably varies along the length of the ribbon so as to give the non-uniform rigidity and/or mass profile. By providing a ribbon having a varying cross-section, the desired rigidity and/or mass profile for the ribbon can be easily achieved by appropriate modelling of the ribbon structure, for example using Finite Element Analysis, and a variety of manufacturing techniques.

Preferably, the varying cross-sectional profile of the ribbon is provided by a section of the ribbon having parts of the planar cross-section removed to relatively reduce the rigidity of that section of the ribbon. A slotted section of the ribbon may be provided to reduce the rigidity of the ribbon in that section. A section of the ribbon may have a cross-section that is hollowed out to have a patterned structure that provides a low mass per unit length in that section without reducing the structural strength and rigidity of that section. An example of such a patterned structure is a honey-comb structure, which is naturally light-weight but strong. Alternatively, an arrangement of pattern of holes may be provided in a section of the ribbon to reduce the rigidity of that section.

Alternatively, or in addition, the varying cross-sectional profile of the ribbon is provided by a section of the ribbon having a cross-section comprising a structure that extends out of the plane of the ribbon to relatively increase the rigidity of that section of the ribbon. The cross-sectional profile of the ribbon is preferably in the form of an 'I'-beam in a section of the ribbon about its mid-point. Providing an I-beam section around the midpoint of the ribbon provides increased rigidity in that section without significantly increasing the mass of the ribbon. Further, in the I-beam configuration, and where a knife-edge is provided at the mid-point, the two points of the knife edge can be accommodated inside the hollowed out part of the I-beam section of the ribbon, such that the separation between the two knife edge points is not increased by a thickened section of the ribbon and the knife edge behaves more like a point rotating constraint.

The rigidity and/or mass profile of the ribbon are preferably selected by optimisation of a Finite Element Analysis model of the ribbon. By modelling a design for the ribbon's rigidity and/or mass profile using the Finite Element Method to perform a modal analysis of the ribbon's displacement response, the design can be optimised to maximise the sensitivity of the gradiometer device. Further, the thickness profile of the ribbon, the profile of the ribbon's material properties and/or the cross-sectional profile of the ribbon are preferably selected by optimisation of a Finite Element Analysis model of the ribbon. Using this technique, an optimised design for the ribbon's structure can also be provided. This structural design of the ribbon can be optimised to provide to one which provides a desired rigidity and/or mass profile, or alternatively the structural design of the ribbon itself can be optimised directly to maximise the sensitivity of the gradiometer device.

Movement preventing means is preferably provided arranged to prevent transverse movement of the ribbon away from its rest position at the mid-point between the ends of the ribbon. Such movement preventing means, for example a knife edge, restricts the deformation of the ribbon in its unwanted symmetric modes.

Viewed from another aspect, the present invention provides a method of measuring quasi-static gravity gradients comprising: holding a flexible ribbon under tension at both ends; arranging sensing means to detect the transverse displacement of the ribbon from an undisturbed position due to the gravitational field acting on said ribbon and to generate a signal representing the displacement; and generating, responsive to said displacement signal, an output signal which is a function of the gravitational gradient tensor of the gravitational field; wherein the ribbon has a non-uniform rigidity profile and/or mass profile along its length such that, in use, the displacement response of the ribbon due to the gravitational gradient of the gravitational field is enhanced and/or the displacement response of the ribbon due to the absolute gravitational acceleration of the gravitational field is suppressed.

According to the method and apparatus of the invention, the sensitivity of the gradiometer device may be significantly greater than a gradiometer having a ribbon that does not have a rigidity profile and/or mass profile arranged such that its displacement response due to gravitational gradients is enhanced and its displacement response due to absolute gravitational acceleration is suppressed. The increased sensitivity of the gradiometer of the invention makes it more suitable for practical deployment and more useful in the above-mentioned practical applications.

BRIEF DESCRIPTION OF THE DRAWINGS

Certain preferred embodiments of the invention will now be described by way of example only, and with reference to the accompanying drawings, in which:

FIGS. 8a-8b show the result of a similar analysis of the displacement response of a ribbon according to the sixth embodiment of the invention in the 'S' and 'W' modes of oscillation;

Figure 1:
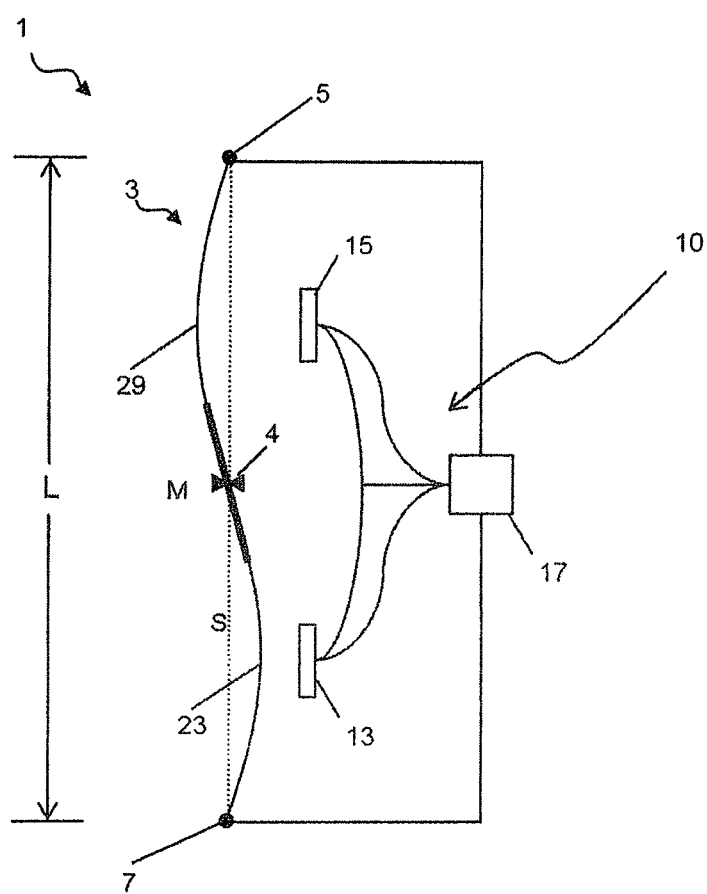
FIG. 1 is a schematic of a gravitational gradiometer according to a first embodiment of the present invention.
Figure 2A:
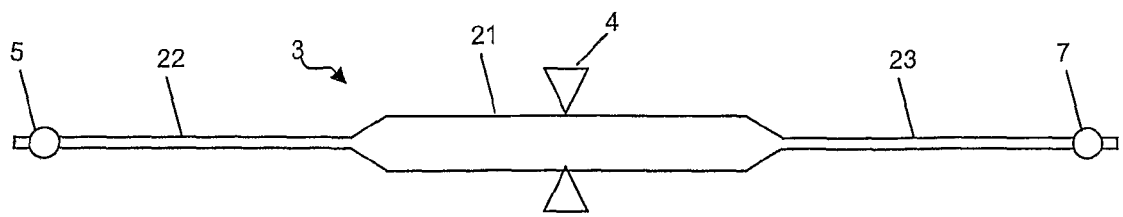
FIGS. 2a-2d are side views of a ribbon provided in the gravitational gradiometer of FIG. 1 in its various modes of oscillation.

The sensing element of the first embodiment of a gravitational gradiometer device 1 according to the invention shown in FIG. 1 is provided by a long ribbon 3 having a width and a depth much smaller than its length. The ribbon 3 provided in device 1 is shown in detail in FIG. 2a in its unperturbed state (i.e. its rest position).

DETAILED DESCRIPTION OF THE DRAWINGS

The ribbon 3 has a length, L, of the order of tens of centimeters and has a width, W, that is greater than its depth, D, such that the ribbon 3 resembles a length of tape (i.e. $L \gg W > D$). This ribbon shape means that the displacement of the ribbon 3 is constrained to the direction orthogonal to the plane of the ribbon's major extent (in its length and width directions) and the gradiometer is thus only sensitive to forces causing the ribbon 3 to be displaced in this direction (the direction being the depth direction of the ribbon). The ribbon 3 is constructed to have a relatively thickened middle section 21 about its mid-point M compared to relatively thin outer sections 22, 23. The middle section 21 has a total length of about a quarter of the length of the ribbon 3. As will be explained below, this non-uniform rigidity profile is such that the displacement response of the ribbon 3 due to absolute gravitational acceleration is suppressed.

The ribbon 3 is held under tension between two fixed points 5, 7 at its longitudinal ends. Between these two fixed points 5, 7, movement preventing means 4 is provided as a 'knife-edge' device mounted at the mid-point M of the ribbon 3 at its rest position to touch the ribbon 3 but not exert any force thereon. The ribbon 3 is otherwise free to move such that it can be displaced away from the straight line S joining the two points under the influence of any external force acting on the ribbon 3, such as a gravitational force acting on the ribbon 3 and a differential gravitational gradient across the ribbon 3.

The displacement of the ribbon 3 from its rest position can generally be described by the force balance equation (3) set out above which has solutions in the form of the sum of the modes of vibration of the ribbon 3 that make up the components of the decomposed infinite Fourier sum set out above in equation (4).

However, the movement preventing means 4 restricts any transverse movement of the ribbon 3 away from its rest position at the mid-point M and adds another boundary condition that reduces the deformation of the ribbon 3 into its symmetric modes of oscillation (however, the W-mode of oscillation remains, which is the linear sum of all remaining symmetrical mode deflections) while not reducing the deformation of the ribbon 3 into its anti-symmetric modes.

Sensing means 10 is provided to detect the transverse displacement of the ribbon 3 from an undisturbed position S due to the gravitational gradient acting on the ribbon and to generate a signal representing the displacement. The sensing means 10 is provided generally in the form known in the art described above. Two pick-up coils 13, 15 are positioned symmetrically about the mid-point M of the ribbon 3 and are electrically connected to form the two arms of a resonant bridge circuit (not shown) and to a control and detection system 17. Control and detection system 17 is also electrically connected to the ribbon 3 to pump the ribbon 3 with an AC carrier signal generated therein, and having a frequency above the mechanical bandwidth of the ribbon (such that magnetic forces acting on the ribbon are clamped). The frequency of the resonant bridge circuit is tuned to that of the AC carrier signal such that a corresponding signal is generated in each pick-up coil 13, 15 having a strength that increases as the distance between the ribbon 3 and the pick-up coil 13, 15 decreases. The displacement signal output from the bridge circuit is retrieved in control and detection system 17 by synchronous detection together with the carrier signal. The pick-up coils 13, 15 and bridge circuit are balanced in an anti-phase arrangement such that the signal output from the bridge circuit is sensitive primarily to the displacement of the ribbon 3 in the 'S' mode of oscillation. By amplifying and processing the displacement signal, the control and detection system 17 generates an output signal which is a function of the gravitational gradient tensor of the gravitational field. Any remaining displacement of the ribbon in the parasitic modes (in this case, the 'W' mode) contributes to the noise level above which the displacement signal must be detected, and limits the sensitivity of the gradiometer.

However, the thickened middle section 21 of the ribbon 3 provides the ribbon 3 with a relatively high rigidity in the section extending through its mid-point M such that the ribbon 3 requires a greater force to be applied in order to bend the ribbon 3 in this section. In contrast, the relatively thin outer sections 22, 23 have a relatively low rigidity such that less force is required to bend the ribbon 3 in these sections.

Figure 2B:
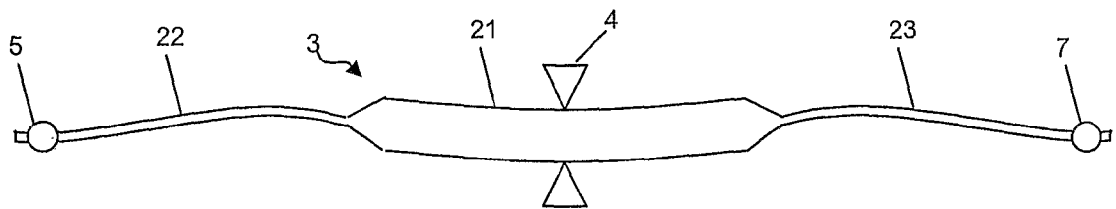

FIG. 2b shows the deformation of the ribbon 3 of the first embodiment of the invention into the 'W' mode of oscillation, with the knife edge 4 constraining the mid-point of the ribbon at its rest position. As can be seen, in order to deform into the 'W' mode, the middle section 21 of the ribbon must bend significantly. As this middle section 21 has a relatively high rigidity, the force required to bend this middle section 21 and deform the ribbon 3 into the 'W' mode is relatively high. Thus the ribbon 3 of the first embodiment of the invention is relatively less able to deform in the 'W' mode than an equivalent ribbon having a uniform rigidity profile and/or mass profile along its length.

Figure 2C:
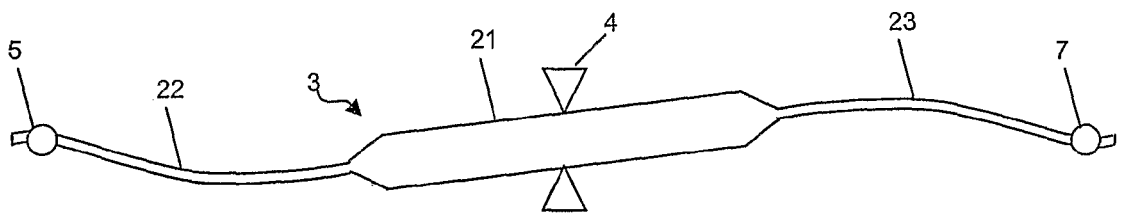

FIG. 2c shows the deformation of the ribbon 3 of the first embodiment of the invention into the 'S' mode of oscillation, with the knife edge 4 constraining the mid-point of the ribbon at its rest position. As can be seen, in order to deform into the 'S' mode, the relatively thin outer sections 22, 23 of the ribbon 3 must bend significantly at the antinodes, whereas very little bending of the middle section 21 of the ribbon 3 is required about the node at the mid-point M of the ribbon 3. As the relatively rigid middle section 21 does not need to be bent, the force required to deform the ribbon 3 into the 'S' mode is relatively unchanged. Thus the ribbon 3 of the first embodiment of the invention is not relatively less able to deform in the 'S' mode than an equivalent ribbon having a uniform rigidity profile and/or mass profile along its length.

Therefore, as the ribbon 3 is relatively less able to deform in the 'W' mode but not relatively less able to deform in the 'S' mode, the displacement response of the ribbon 3 due to the absolute gravitational acceleration of the gravitational field is suppressed. This reduces the noise level above which the gravitational gradient signal must be detected and provides a gradiometer device 1 having a high sensitivity.

Figure 2D:
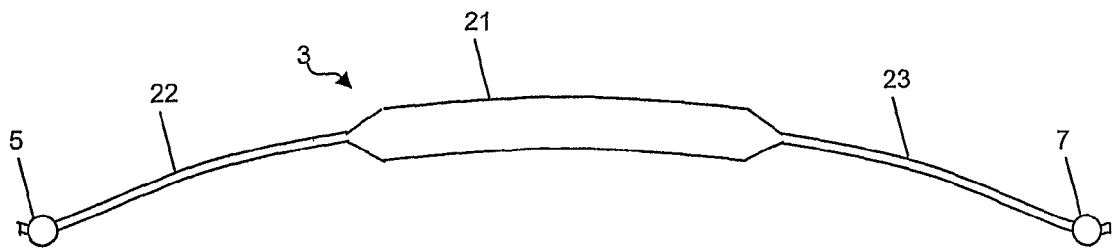

Further, if the gradiometer device 1 of the first embodiment were permitted to operate in the absence of a movement prevention means 4, then the ribbon 3 would be permitted to deform into its fundamental 'C' mode, as shown in FIG. 2d. As can be seen, in order to deform into the 'C' mode, the middle section 21 of the ribbon must also bend significantly. The relatively high rigidity of the middle section 21 thus also makes the ribbon 3 of the first embodiment of the invention relatively less able to deform in the 'C' mode than an equivalent ribbon having a uniform rigidity profile and/or mass profile along its length.

More broadly, as all symmetrical modes of oscillation have an antinode at the mid-point M of the ribbon in this thickened section, and as all anti-symmetrical modes have a node at this mid-point M, the relatively rigid middle section 21 causes the ribbon 3 to deform relatively less easily in its symmetrical modes when compared with an equivalent ribbon having a uniform rigidity profile and/or mass profile along its length, while not significantly affecting the ability of the ribbon 3 to deform in its anti-symmetrical modes. Therefore, in absence of a movement prevention means 4, the design of the ribbon 3 of the first embodiment of the invention also suppresses the displacement response of the ribbon 3 due to the absolute gravitational acceleration of the gravitational field and reduces the noise level above which the gravitational gradient signal must be detected. Thus a gradiometer 1 having a high sensitivity is provided.

Figure 3:
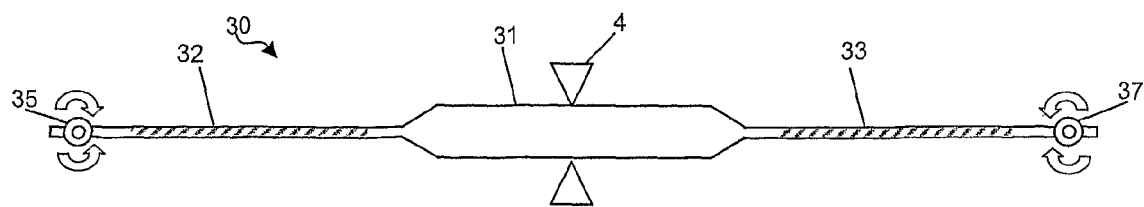
FIG. 3 is a detailed schematic of a ribbon for a gravitational gradiometer according to a second embodiment of the invention.

FIG. 3 shows detail of a ribbon 30 provided in a second embodiment of a gravitational gradiometer of the invention. In this second embodiment, the ribbon 30 is provided in the gradiometer device 1 of the first embodiment in place of the ribbon 3. The rigidity profile of the ribbon 30 is similar to the ribbon 3 of the first embodiment in that it has a relatively thickened middle section 31 extending through the ribbon's mid-point M, giving a relatively high rigidity here. The ribbon 30 of the second embodiment differs from the ribbon 3 of the first embodiment in that it has relatively massive outer sections 32, 33, extending through the 1 L/4 and 3 L/4 positions. Mass is added to these outer sections by, for example, vapour deposition in this area by laser ablation. These relatively massive outer sections 32, 33 have a low rigidity compared to the relatively thick middle section 31. Thus the ribbon 30 of the second embodiment is similar to the ribbon 3 of the first embodiment except that mass has been added to the ribbon around the antinodes of the 'S' mode. By adding mass at these positions, the force on the ribbon here is relatively increased and thus the total deflection of the ribbon at these points for the same gradient acceleration is greater than for that of an equivalent ribbon having a uniform mass profile.

Thus due to the non-uniform mass profile of the ribbon 30 of the second embodiment, the ribbon 30 is relatively more able to deform in the 'S' mode than an equivalent ribbon having a uniform mass profile. The relatively massive outer sections 32, 33 providing the non-uniform mass profile of the ribbon 30 also have the effect of urging an increase in the deflection in the 'W' mode. However, the relatively rigid middle section 31 of the ribbon severely limits this increase in the 'W' mode deflection.

Therefore the displacement response of the ribbon 30 due to gravitational gradients is enhanced. The displacement response of the ribbon 30 to absolute gravitational acceleration is also suppressed. This increases the strength of the gradiometer signal above the noise level leading to a gradiometer having increased sensitivity.

To further increase the ability of the ribbon to deform in its 'S' mode, the rigidity of the ribbon about its L/4 and 3 L/4 positions is relatively reduced compared with other sections of the ribbon, particularly the section extending through the mid-point M. This is achieved by annealing the ribbon in these sections.

In the second embodiment, the clamps 35, 37 provided at the ends of the ribbon 30 to hold the ribbon under tension are arranged to allow the ribbon 30 to deflect easily about the end boundary condition locations, as shown by the arrows in FIG. 3, while not allowing the ribbon to move by translation laterally away from the boundary condition location. This ease of deflection is provided by the clamps 35, 37 having a pivoting mechanism to allow the ribbon to pivot about the clamps. Providing pivoting clamps 35, 37 increases the effective length of the ribbon and increases the deflection of the ribbon 30 in its various modes of oscillation, notably its 'S' mode, increasing, the sensitivity of the gradiometer device.

Alternatively, this ease of ribbon deflection around the end boundary condition locations can be enabled by providing each clamp in the form of a pair of rollers, one provided on either side of the ribbon. The effective length of the ribbon may also be increased by relatively decreasing the rigidity of the ribbon near the boundary condition locations in the sections of the ribbon around the end clamps. This can be achieved by relatively thinning the ribbon in this area.

Figure 4:
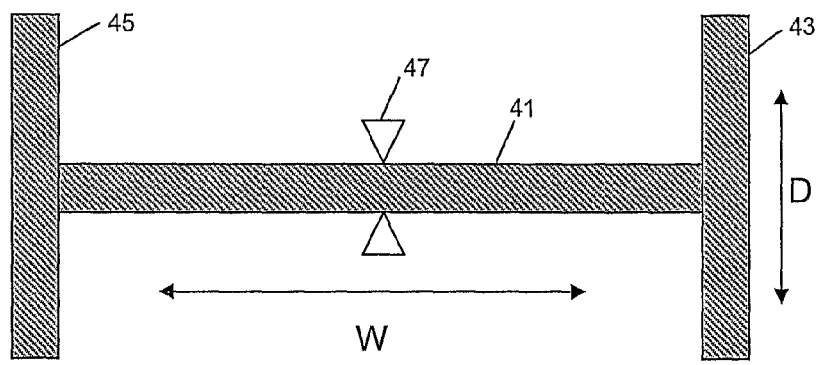
FIG. 4 is a detailed schematic cross-sectional view of a I-beam shaped section about a mid-point of a ribbon for a gravitational gradiometer according to a third embodiment of the invention.

FIG. 4 shows a cross-sectional profile of a ribbon of third embodiment of the invention in which the plane 41 of ribbon forms a web between two flanges 43, 45, provided on either side of the plane 41 of the ribbon such that the ribbon is in the form of an 'I'-beam. The flanges 43, 45 may be integrally formed with the plane 41 of the ribbon by, for example, extruding or rolling, or the flanges 43, 45 may be formed separated and attached to the ribbon 41. Specific sections of the ribbon may be provided with this I-beam cross-section to provide them with increased rigidity but not a significantly increased mass compared with other sections of the ribbon in which the flanges 43, 45 are omitted. Providing a ribbon having an I-beam section around the midpoint of the ribbon, as shown in FIG. 4, provides increased rigidity in about the mid-point that suppresses the W-mode without significantly increasing the mass of the ribbon. Further, the two knife-edge 47 points provided at the mid-point of the ribbon can be accommodated inside the hollowed out part of the I-beam section of the ribbon. In this embodiment, the separation between the two knife edges points 47 is not increased by a thickened section of the ribbon and the knife edge behaves more like a point rotating constraint.

Figure 5:
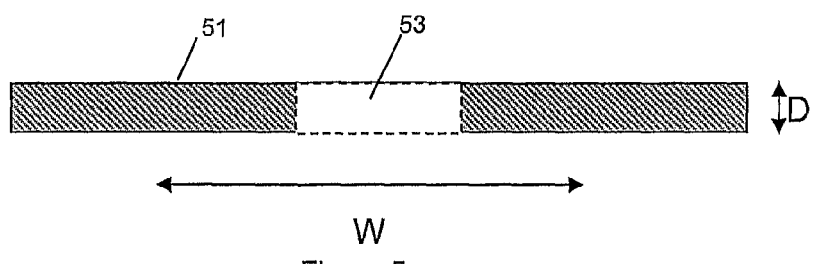
FIG. 5 is a detailed schematic cross-sectional view of a slotted section of a ribbon for a gravitational gradiometer according to a fourth embodiment of the invention.

FIG. 5 shows a cross-sectional profile of a ribbon of fourth embodiment of the invention in which a slotted section 53 is provided in the plane 51 of ribbon at or near to the boundary condition locations at the ends of the ribbon to reduce the rigidity of that section of the ribbon without significantly reducing the mass. The slot 53 may be cut using simple machining techniques. Reducing the rigidity of the ribbon in this way at or near the boundary condition locations at the ends of the ribbon causes the ribbon to be relatively more able to deform in the 'S' mode. Alternatively, to reduce the rigidity of a section of the ribbon a pattern of holes may be provided through the ribbon.

Figure 6:
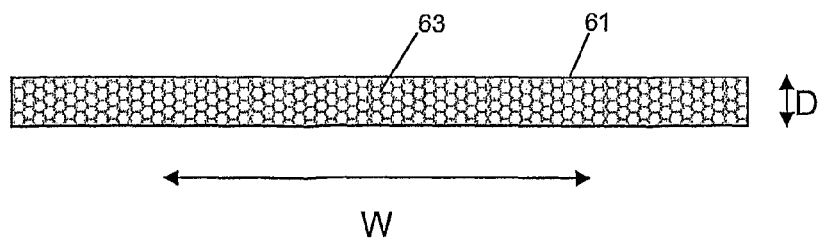
FIG. 6 is a detailed schematic cross-sectional view of a honeycomb section of a ribbon for a gravitational gradiometer according to a fifth embodiment of the invention.

FIG. 6 shows a schematic representation of cross-sectional profile of a section of a ribbon 61 of a fifth embodiment of the invention, being formed to have a recurring honeycomb structure 63. The honeycomb structure can be designed and manufactured using suitable CAD/CAM techniques. The honeycomb structure 63 provides this section of the ribbon with a relatively reduced mass but not a significantly reduced rigidity, compared with other sections of the ribbon.

The ribbons 3 and 30 of the first to fifth embodiments are only shown schematically in the drawings to illustrate how the advantageous effects of providing a non-uniform mass and/or rigidity profile may be realised. A variety of ribbon arrangements are possible that are in accordance with the invention in that they suppress the absolute gravitational acceleration signal and/or enhance the gravitational gradient signal.

In practice, the design for the mass and rigidity profile of the ribbon may be subject to rigorous modelling by Finite Element Analysis and lab testing to verify the model. Any suitable FEA modelling software can be used to aid the design of the ribbon. An example of a suitable FEA modelling software package is MSC Advanced FEA available from MSC Software of Santa Ana, Calif., USA (www.mscsofware.com).

By this FEA design process, the final ribbon design can also be selected by optimisation of its modelled mechanical response (and particularly its displacement response in its different modes) to provide maximum sensitivity of the gradiometer to the gravity gradient of the gravitational field. That is, the ribbon design can be optimised to balance that maximisation of the enhancement of the displacement response due to the gravity gradient of the gravitational field with the maximisation of the suppression of the displacement response due to the absolute gravitational acceleration of the gravitational field. FEA modelling of the ribbon's mechanical response can also be used to ensure that the ribbon's displacement response is highly linear and reproducible, which is essential for accuracy and repeatability in gradiometric sensing.

Despite the use of FEA modelling to provide the final optimal ribbon design, the general principles for selectively engineering the ribbon's displacement response in its different modes by providing a non-uniform profile in accordance with the invention can be simply summarized as follows:

The magnitude of the ribbon's deflection in a particular mode can be increased by increasing the mass profile of the ribbon in the sections of the ribbon around the antinodes of that mode. The mass of a section of the ribbon can be increased, for example, by vapour deposition of material, by thickening or widening the ribbon, or by increasing the density of a composite ribbon in that section. While some of these mass increasing techniques also increase the rigidity, for increased mass at the L/4 and 3 L/4 positions, it has been found that generally, the effect of the increased rigidity in these sections is outweighed by the effect of the increased mass, such that there is a net increase in deflection in the 'S' mode.

The opposite effect of decreasing the ribbon's deflection in a particular mode can also be achieved by decreasing the mass profile of the ribbon in the sections of the ribbon around the antinodes of that mode. A mass decrease without significantly decreased rigidity can be achieved, for example, by hollowing out the ribbon to have a light but rigid structure, for example, a honeycomb structure. A mass decrease can also be achieved by thinning or narrowing the ribbon.

The magnitude of the ribbon's deflection in a particular mode can be increased by decreasing the rigidity profile of the ribbon in the sections of the ribbon around the antinodes of that mode, or any other bending points. A rigidity decrease without significantly decreased mass can be achieved, for example, by annealing the ribbon, or by cutting slotted holes or patterned holes in the ribbon. A rigidity decrease can also be achieved by thinning or narrowing the ribbon.

The opposite effect of decreasing the ribbon's deflection in that particular mode can also be achieved by increasing the rigidity profile of the ribbon in the sections of the ribbon around the antinodes of that mode, or any other bending points. A rigidity increase without significantly increased mass can be achieved by, for example, tempering the ribbon, or by providing a rigid cross-sectional profile that resists deformation (e.g. an 'I'-beam profile). A rigidity increase can also be achieved by increasing the thickness or width of the ribbon.

The desired variations of the mass profile may therefore be provided by varying the shape and dimensions of the ribbon (e.g. its thickness) or varying the material properties of the ribbon by, for example, providing a design having a composite mix of materials having different densities, or by processing the ribbon to alter its material properties.

Similarly, the desired variations of the rigidity profile may therefore be provided by varying the shape or dimensions of the ribbon (e.g. its thickness), varying the structural design of the ribbon or varying the material properties of the ribbon by, for example, providing a design having a composite mix of materials having different elastic moduli, or by processing the ribbon to alter its material properties such as its elastic modulus.

The ribbon according to the final design can be provided using any suitable material having material properties in accordance with the design, or a composite mix of materials, and by using any suitable manufacturing method or post-manufacturing processing known in the art. However, it is preferable to form the ribbon from a single sheet of a suitable metal material, for example, phosphor bronze, as this facilitates manufacture. Suitable machining techniques can be used to form the ribbon to the optimised design, with CAD/CAM techniques being desirably used. Other metalworking techniques (such as rolling or extrusion) can be used to provide a desired ribbon cross section. Material can be removed from the ribbon using other suitable techniques such as timed chemical etching and material can be added to the ribbon using suitable deposition techniques such as laser ablation to produce a hot vapour of a metal material which is then deposited on the ribbon. Heat treatment techniques can be employed to alter the rigidity of the ribbon, such as annealing or tempering. These can be localised at desired points on the ribbon.

FIGS. 7-9 show the results of a modal analysis of the displacement response of a three ribbons having different mass and rigidity profiles, modelled using Finite Element Analysis.

Each of the modelled ribbons have dimensions of 300 mm×5 mm×0.3 mm and are fixed at their ends such that they cannot translate away from these fixed positions or rotate thereabout. The modelled ribbons are also fixed at their rest positions at their mid-points such that they cannot translate away from this position.

Figure 7A:
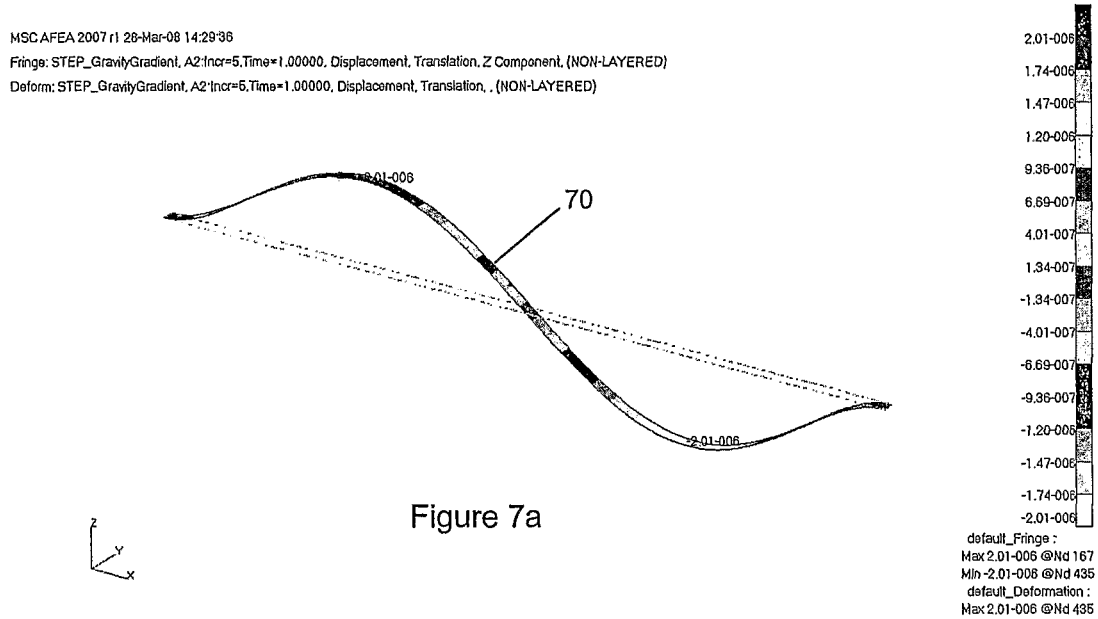
FIGS. 7a-7b show the result of a modal analysis of the displacement response of a prior art ribbon having a uniform mass and rigidity profile in the 'S' and 'W' modes of oscillation, modelled using Finite Element Analysis.
Figure 7B:
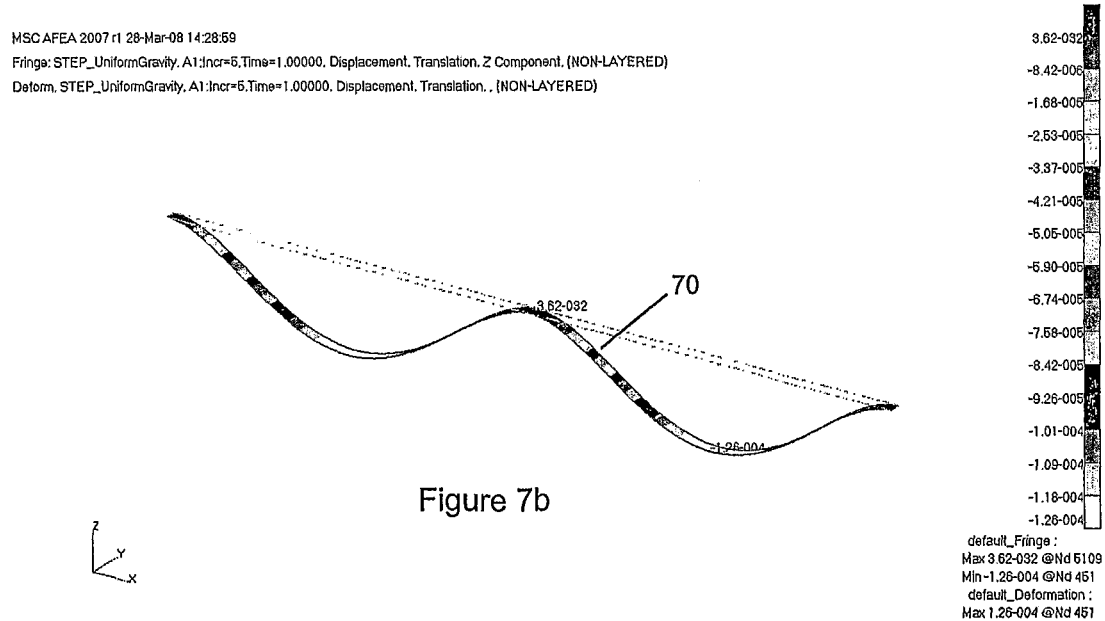
Figure 10A:
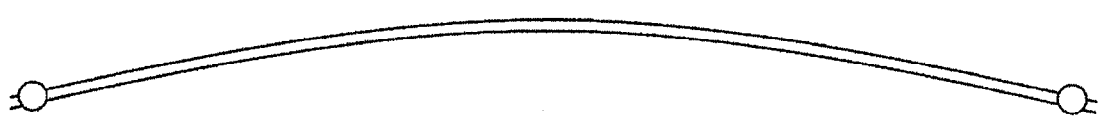
FIGS. 10a-10c, already described, are schematics showing the main modes of oscillation of a prior art ribbon having a uniform mass and rigidity profile.
Figure 10B:
Figure 10C:
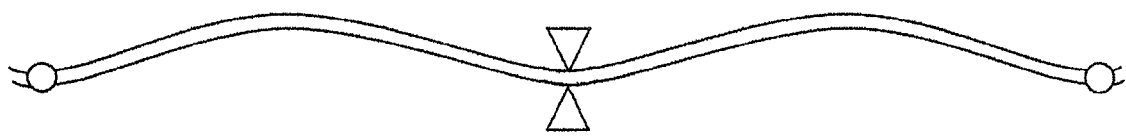

FIGS. 7a and 7b show a model of a ribbon of the prior art type shown in FIG. 10, formed of a strip of uniform material 70, having a uniform cross-sectional profile such that the ribbon does not have a non-uniform rigidity or mass profile.

FIGS. 8a and 8b show a model of a ribbon 80 for a gradiometer according to a sixth embodiment the invention, which is similar to a combination of the first and fourth embodiments. The ribbon of the sixth embodiment has a section 81 having an increased rigidity provided by a thickened section around its mid-point, thinned and slotted sections 83, 85 having decreased rigidity at its end points around its boundary condition locations, and normal thickness in all other sections of the ribbon.

Figure 9A:
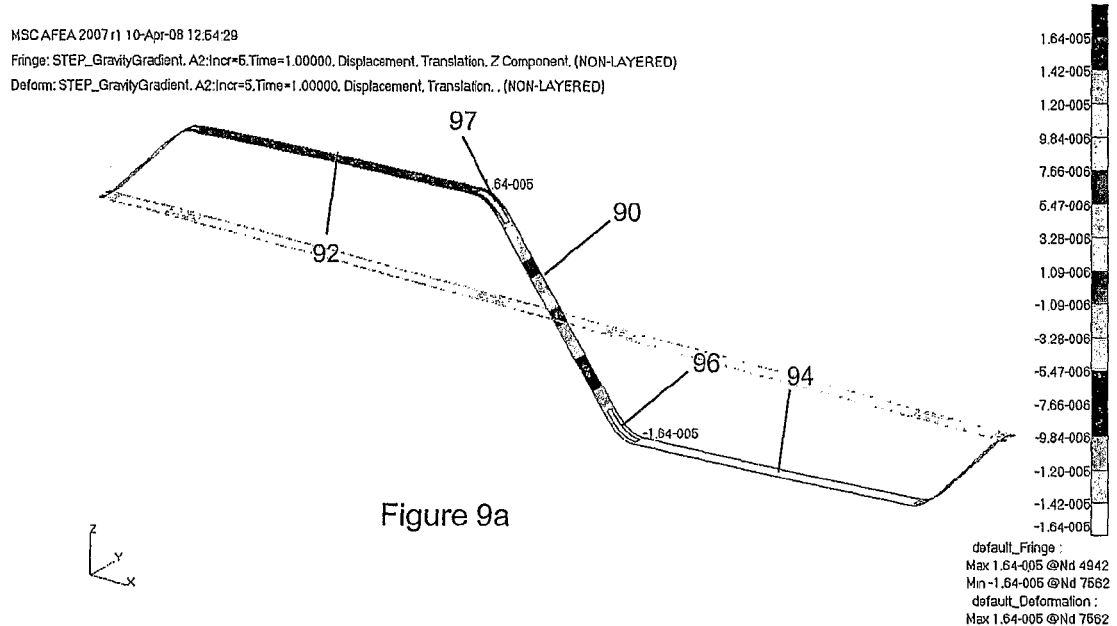
FIGS. 9a-9b show the result of an identical analysis of the displacement response of a ribbon according to a seventh embodiment of the invention in the 'S' and 'W' modes of oscillation.
Figure 9B:
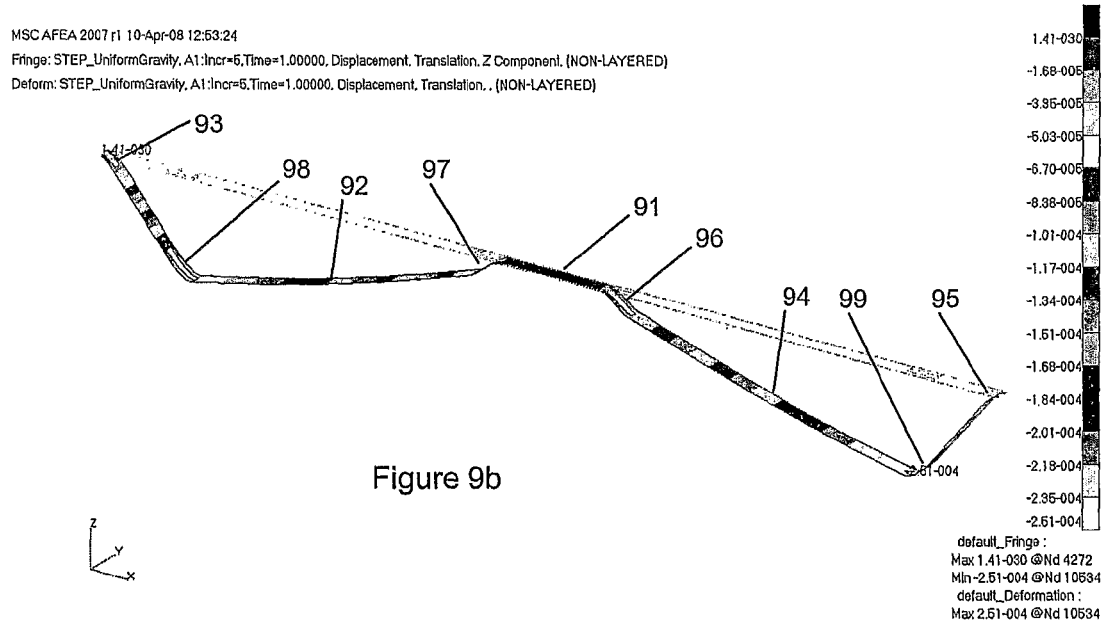

FIGS. 9a and 9b show a model of a ribbon 90 for a gradiometer according to a seventh embodiment of the invention, which is similar to the sixth embodiment except that it has additional thickened sections 92, 94 of increased rigidity around its L/4 and 3 L/4 positions and thinned slotted sections 96, 97 having decreased rigidity at either side of its rigid middle section 91 such that each thickened rigid section 91, 92, 94 is separated by a thinned slotted section of decreased rigidity. Further slotted sections 98, 99 of decreased rigidity are also provided at locations proximal to, but distant from, the end points of the ribbon. This is a ribbon design that is produced by an FEA model optimising the rigidity and mass profile to increase gradiometer sensitivity, and it is therefore more 'exotic' or 'intelligent'. Indeed, the provision of thickened rigid sections 92, 94 around the L/4 and 3 L/4 positions of the ribbon 90 has the effect of reducing the ability of the ribbon 90 to deform in its 'S' mode. However, as we shall see, this may result in an increased overall magnitude of deflection of the ribbon 90 in is anti-symmetric modes, and an increased gain in gradiometer sensitivity.

The modelled ribbons are subjected to absolute gravitational acceleration of $g=9.8$ m s$^{-2}$ (at the Earth's surface) such that they deform into their anti-symmetric 'W' mode (see FIGS. 7b, 8b and 9b) and to be subjected to a gravitational gradient of $T=1$ s$^{-2}=1\times10^9$ EU, such that they deform into their symmetric modes, dominated by the 'S' mode component (see FIGS. 7a, 8a and 9a). Both modelled gravitational forces are in the direction of sensitivity of the ribbon.

The magnitude of the maximum displacement of each ribbon in their anti-symmetric and symmetric modes are compared below in Table 1.

TABLE 1

| Profile | Gravity Gradient Gain Compared to Uniform Ribbon | Absolute Gravitational Acceleration Gain Compared to Uniform Ribbon | Overall Gain Compared to Uniform Ribbon |
| --- | --- | --- | --- |
| Uniform prior art ribbon (FIG. 7) | N/A | N/A (comparative value) | N/A |
| First Embodiment (FIG. 8) | 2.2 | 0.85 | 2.6 |
| Sixth embodiment (FIG. 9) | 8.2 | 2.0 | 4.1 |

It can be seen that, compared to the 'uniform' prior art ribbon shown in FIG. 7, the ribbon 80 of the sixth embodiment of the invention shown in FIG. 8 has a gain in the maximum displacement due to absolute gravitational acceleration of 0.85 (i.e. a reduction) and a gain in the maximum displacement due to gravitational gradient of 2.2. Thus the section 81 of increased rigidity at the mid-point of the ribbon 80 has suppressed its sensitivity to the 'W' mode compared to the uniform ribbon 70, and the thinned slotted sections 83, 85 of reduced rigidity at the end points of the ribbon have increased its sensitivity to the 'S' mode compared to the uniform ribbon 70. This represents an overall sensitivity gain of 2.6 for the gradiometer of the sixth embodiment of the invention, when compared to the prior art 'uniform' gradiometer.

Further, compared to the 'uniform' prior art ribbon shown in FIG. 7, the ribbon 90 of the seventh embodiment of the invention shown in FIG. 9 has a gain in maximum displacement due to absolute gravitational acceleration of 2.0 and a gain in the maximum displacement due to gravitational gradient of 8.2. This represents an overall sensitivity gain of 4.1 for the gradiometer of the seventh embodiment of the invention, when compared to the prior art gradiometer. Clearly, even though the ribbon 90 of this seventh embodiment of the invention has an increased sensitivity to the 'W' mode compared to the ribbon of the prior art, a higher overall gradiometer signal gain can still be achieved by optimising an intelligent ribbon design. As can be seen from FIG. 9, the deformation of the 'intelligent' ribbon 90 of this seventh embodiment of the invention is very unusual in that the maximum deflection is located a distance from the L/4 and 3 L/4 positions. However, unusual gravity gradient anti-symmetric ribbon deflections are advantageous provided the detected gravity gradient signal is increased relative to the detected absolute gravitational acceleration symmetric ribbon deflections. The coil detectors 13, 15 do not have to be positioned at the location of maximum gravity gradient anti-symmetric ribbon deflection, though this may be advantageous.

The invention claimed is:

1. Apparatus for the measurement of quasi-static gravity gradients comprising:
    a flexible ribbon held under tension at both ends;
    a sensing device arranged to detect a transverse displacement of the ribbon from an undisturbed position due to a gravitational field acting on said ribbon and to generate a signal representing the displacement; and
    an output device coupled to said sensing device and responsive to said displacement signal to generate an output signal which is a function of a gravitational gradient tensor of the gravitational field;
    wherein the ribbon has at least one of a non-uniform rigidity profile or a non-uniform mass profile along its length such that, in use, at least one of the following occurs:
        a displacement response of the ribbon due to the gravitational gradient of the gravitational field is enhanced; or
        a displacement response of the ribbon due to an absolute gravitational acceleration of the gravitational field is suppressed.

2. Apparatus as claimed in claim 1, wherein the rigidity or mass profile of the ribbon is arranged such that the ribbon is relatively less able to deform in its symmetric modes and is not relatively less able to deform in its anti-symmetric modes than an equivalent ribbon having at least one of a uniform rigidity profile or uniform mass profile along its length.

3. Apparatus as claimed in claim 2, wherein the rigidity of the ribbon in a section about its mid-point between its longitudinal ends is relatively increased, compared with other sections of the ribbon.

4. Apparatus as claimed in claim 3, wherein the relatively increased rigidity of the ribbon about its mid-point is provided by a relatively thickened section of the ribbon about its mid-point.

5. Apparatus as claimed in claim 1, wherein the rigidity or mass profile of the ribbon is arranged such that the ribbon is relatively less able to deform in the 'C' mode and 'W' mode and is not relatively less able to deform in the 'S' mode than an equivalent ribbon having at least one of a uniform rigidity profile or uniform mass profile along its length.

6. Apparatus as claimed in claim 1, wherein the rigidity or mass profile of the ribbon is arranged such that the ribbon is more able to deform in its anti-symmetric modes than an equivalent ribbon having a uniform rigidity profile or uniform mass profile along its length.

7. Apparatus as claimed in claim 6, wherein the rigidity of the ribbon is relatively reduced about L/4 and 3L/4 positions along the length of the ribbon compared with other sections of the ribbon.

8. Apparatus as claimed in claim 6, wherein the rigidity of the ribbon is greater about the mid-point between its longitudinal ends than about the L/4 and 3L/4 positions along the length of the ribbon.

9. Apparatus as claimed in claim 6, wherein the mass per unit length of the ribbon is increased around L/4 and 3L/4 positions along the length of the ribbon.

10. Apparatus as claimed in claim 1, wherein the rigidity or mass profile of the ribbon is arranged such that the ribbon is relatively more able to deform in the 'S' mode than an equivalent ribbon having a uniform rigidity profile or uniform mass profile along its length.

11. Apparatus as claimed in claim 1, wherein the rigidity of the ribbon is relatively reduced around boundary condition locations at end points of the ribbon.

12. Apparatus as claimed in claim 11, wherein the rigidity of the ribbon is reduced by providing slotted sections of the ribbon about the boundary condition locations at the end points of the ribbon.

13. Apparatus as claimed in claim 1, wherein a clamping device is provided at both ends of the ribbon to hold the ribbon under tension, the clamping device being arranged such that the ribbon is easily able to deflect about the clamping means, and such that the ribbon is not permitted to translate laterally away from the clamping means.

14. Apparatus as claimed in claim 1, wherein the thickness of a plane of the ribbon varies along its length so as to give at least one of the non-uniform rigidity or non-uniform mass profile.

15. Apparatus as claimed in claim 14, wherein the varying thickness of the plane of the ribbon is provided by a section of the ribbon having material removed from the ribbon to reduce its planar thickness by machining or by chemical etching, or by a section of the ribbon having material added to the ribbon to increase its planar thickness by vapor deposition.

16. Apparatus as claimed in claim 1, wherein the ribbon's material properties vary along the length of the ribbon so as to give at least one of non-uniform rigidity or non-uniform mass profile.

17. Apparatus as claimed in claim 16, wherein the varying ribbon's material properties are provided by at least one of an annealed section of the ribbon, or a tempered section of the ribbon.

18. Apparatus as claimed in claim 1, wherein a cross-sectional profile of the ribbon varies along a length of the ribbon so as to give at least one of the non-uniform rigidity or non-uniform mass profile.

19. Apparatus as claimed in claim 18, wherein the varying cross-sectional profile of the ribbon is provided by a section of the ribbon having parts of a planar cross-section removed to relatively reduce the rigidity of that section of the ribbon.

20. Apparatus as claimed in claim 18, wherein the varying cross-sectional profile of the ribbon is provided by a section of the ribbon having a cross-section comprising a structure that extends out of a plane of the ribbon to relatively increase the rigidity of that section of the ribbon.

21. Apparatus as claimed in claim 20, wherein the cross-sectional profile of the ribbon is in the form of an 'I'-beam in a section of the ribbon about its mid-point.

22. Apparatus as claimed in claim 1, wherein the at least one of the rigidity or mass profile of the ribbon is selected by optimisation of a Finite Element Analysis model of the ribbon.

23. Apparatus as claimed in claim 1, wherein at least one of a thickness profile of the ribbon, a profile of the ribbon's material properties or a cross-sectional profile of the ribbon is selected by optimisation of a Finite Element Analysis model of the ribbon.

24. Apparatus as claimed in claim 1 further comprising a movement preventing device arranged to prevent transverse movement of the ribbon away from its rest position at a mid-point between the end-points of the ribbon.

25. Apparatus as claimed in claim 1, wherein the ribbon has at least one of the non-uniform rigidity profile or non-uniform mass profile along its length such that, in use, the displacement response of the ribbon due to the gravitational gradient of the gravitational field is enhanced.

26. Apparatus as claimed in claim 1, wherein the ribbon has at least one of the non-uniform rigidity profile or non-uniform mass profile along its length such that, in use, the displacement response of the ribbon due to the absolute gravitational acceleration of the gravitational field is suppressed.

27. Apparatus as claimed in claim 1, wherein the ribbon has at least one of the non-uniform rigidity profile or non-uniform mass profile along its length such that, in use:
   the displacement response of the ribbon due to the gravitational gradient of the gravitational field is enhanced; and
   the displacement response of the ribbon due to the absolute gravitational acceleration of the gravitational field is suppressed.

28. A method of measuring quasi-static gravity gradients comprising:
   holding a flexible ribbon under tension at both ends;
   detecting a transverse displacement of the ribbon from an undisturbed position due to a gravitational field acting on said ribbon and generating a signal representing the displacement; and
   generating, responsive to said displacement signal, an output signal which is a function of a gravitational gradient tensor of the gravitational field;
   wherein the ribbon has at least one of a non-uniform rigidity profile or a non-uniform mass profile along its length such that at least one of the following occurs:
      a displacement response of the ribbon due to the gravitational gradient of the gravitational field is enhanced; or
      a displacement response of the ribbon due to an absolute gravitational acceleration of the gravitational field is suppressed.

29. Method as claimed in claim 28, wherein the ribbon has at least one of the non-uniform rigidity profile or non-uniform mass profile along its length such that the displacement response of the ribbon due to the gravitational gradient of the gravitational field is enhanced.

30. Method as claimed in claim 28, wherein the ribbon has at least one of the non-uniform rigidity profile or non-uniform mass profile along its length such that the displacement response of the ribbon due to the absolute gravitational acceleration of the gravitational field is suppressed.

31. Method as claimed in claim 28, wherein the ribbon has at least one of the non-uniform rigidity profile or non-uniform mass profile along its length such that:
   the displacement response of the ribbon due to the gravitational gradient of the gravitational field is enhanced; and
   the displacement response of the ribbon due to the absolute gravitational acceleration of the gravitational field is suppressed.

* * * * *